United States Patent
Basu et al.

(10) Patent No.: US 7,356,033 B2
(45) Date of Patent: Apr. 8, 2008

(54) METHOD AND APPARATUS FOR PERFORMING NETWORK ROUTING WITH USE OF POWER EFFICIENT TCAM-BASED FORWARDING ENGINE ARCHITECTURES

(75) Inventors: Anindya Basu, Jersey City, NJ (US); Girija J. Narlikar, Jersey City, NJ (US); Francis X Zane, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1093 days.

(21) Appl. No.: 10/301,242

(22) Filed: Nov. 21, 2002

(65) Prior Publication Data

US 2004/0100950 A1 May 27, 2004

(51) Int. Cl.
*H04L 12/54* (2006.01)
(52) U.S. Cl. .................. 370/392; 370/254; 370/256; 370/389; 370/395.31; 370/428; 370/429
(58) Field of Classification Search ............ 370/216, 370/248, 254, 389, 431, 464, 473, 474
See application file for complete search history.

(56) References Cited

U.S. PATENT DOCUMENTS

| | | | | |
|---|---|---|---|---|
| 6,011,795 | A * | 1/2000 | Varghese et al. | 370/392 |
| 6,266,706 | B1 * | 7/2001 | Brodnik et al. | 709/242 |
| 6,711,153 | B1 * | 3/2004 | Hebb et al. | 370/351 |
| 7,002,965 | B1 * | 2/2006 | Cheriton | 370/395.32 |
| 7,219,187 | B1 * | 5/2007 | Khanna et al. | 711/108 |
| 2002/0147721 | A1 | 10/2002 | Gupta et al. | 707/100 |
| 2003/0198234 | A1 * | 10/2003 | Pin | 370/400 |

OTHER PUBLICATIONS

U.S. Appl. No. 10/175,461, filed Jun. 19, 2002, Basu et al.
U.S. Appl. No. 10/246,204, filed Sep. 18, 2002, Basu et al.
A. Gallo, "Meeting Traffic Demands With Next-Generation Internet Infrastructure", *Lightwave*, 18.5:118-123. May 2001. Available at http://www.siliconaccess.com/news/Lightwave_may_01.html.
G. Huston, "Analyzing the Internet BGP Routing Table", *The Internet Protocol Journal*, 4, 2001.
M. Kobayashi, et al, "A Longest Prefix Match Search Engine For Multi-Gigabit IP Processing" in *Proceedings of the International Conf. On Communications* (ICC 2000), pp. 1360-1364, 2000.

(Continued)

*Primary Examiner*—Huy D. Vu
*Assistant Examiner*—Salvador E. Rivas
(74) *Attorney, Agent, or Firm*—Kenneth M. Brown (57) ABSTRACT

A multi-stage (e.g., two-stage) packet-based lookup process using a Ternary Content Addressable Memory (TCAM) divided into partitions. The result of a first stage lookup is used to selectively search one of a plurality of TCAM partitions during the second stage. A subset of destination address bits may be used in the first stage to hash to a selected partition for the second stage. Alternatively, a partitioning algorithm segments a routing trie into partitions, and then, either a separate, small TCAM or one of the partitions is used in the first stage to map a prefix of the destination address to one of the TCAM partitions for use in the second stage. The "trie-based" algorithms may advantageously partition the trie such that each second stage partition comprises a substantially contiguous sequence of routing prefixes in a post-order traversal of the routing trie, together with one or more covering prefixes thereof.

16 Claims, 10 Drawing Sheets

OTHER PUBLICATIONS

H. Liu, "Routing Table Compaction in Ternary CAM", *IEEE Micro*, 22(1):58-64, Jan.-Feb., 2002.

R. Mahajan et al., "Understanding BGP Misconfiguration" *in Proceedings of SIGCOMM '02*, Aug., 2002.

A.J. McAuley, et al., "Fast Routing Table Lookup Using CAMs", in *Proceedings of Infocom '93*, pp. 1382-1391, Mar. 1993.

D. Shah et al., Fast Updating Algorithms for TCAMs, *IEEE Micro*, 21 (1): 36-47, Jan.-Feb., 2001.

V. Srinivasan et al., "Fast Address Lookups Using Controlled Prefix Expansion", *ACM Transactions on Computer Systems*, 17(1): 1-40, Feb. 1999.

J. van Lunteren et al., "Multi-Field Packet Classification Using Ternary CAM", *Electronics Letters*, 38(1):21-23, 2002.

J. P. Wade et al., "A Ternary Content Addressable Search Engine", *IEEE Journal of Solid-State Circuits*, 24(4):1003-1013, Aug. 1989.

Panigrahy, Rina, Sharma, Samar "Reducing TCAM Power Consumption and Increasing Throughput" Proceedings of the 10th Symposium on High Performance Interconnects Hot Interconnects (HotI'02) Publication date: Aug. 20, 2002.

* cited by examiner

```
B = { } ;
bins = {P} ;
for i = 1 to k
    minmax = ∞ ;
    foreach bit ∈ {, ... , 16} - B
        bins_b = {s_{b=0}, s_{b=1} | s ∈ bins } ;
        max_b = max (bins_b) ;
        if (minmax > max_b) then
            min_bit = b ;
            minmax = max_b ;
        endif
    endforeach
    B = B ∪ min_bit ;
    bins = bins_{min_bit}
endfor
```

```
subtree-split(b) :
    while (there is a next node in post order)
        p = next node in post order ;
        if (count(p) > ⌈b/2⌉ and
            (count(parent(p)) > b ) then
                carve out subtree rooted at p
                put subtree in new TCAM bucket bu
                put prefix(p) in index TCAM
                bu = bu ∪ {cp(p)}
                foreach node u along path from root to p
                    count(u) = count(u) - count(p)
                    if (count(u) == 0) then remove u endif
                endforeach
        endif
    endwhile
```

| index | bucket prefixes | bucket size | covering prefix |
|---|---|---|---|
| 010* | 0100*, 01000* | 2 | 0* |
| 0* | 0*, 0110*, 01100*, 01101* | 4 | 0* |
| 11010* | 110100*, 110101* | 2 | 1101* |
| * | 10*, 1101*, 11011*, 110111* | 4 | − |

```
postorder-split(b):
    i = 0 ;
    while (there is a next node in post order)
        p = next node in post order
        carve-exact ( p, b, i )
        i = i + 1
    endwhile
carve-exact ( p, s, i ):
    if (count(p) == s ) or
       (count(p) < s and
        count(parent(p)) > s ) then
            carve out subtree rooted at p
            put subtree in TCAM bucket $bu_j$
            put prefix(p) in index TCAM($index_j$)
            $bu_j$= $bu_j$ ∪ {cp(p)}
            foreach node u along path from root to p
                count(u) = count(u) - count(p)
                if (count(u) == 0) then remove u endif
            endforeach
            if (count(p) < s ) then
                x = count(p)
                q = next node in post order
                carve-exact(q, s −x, i)
            endif
    endif
```

| i | index$_i$ | bucket prefixes | size | covering prefixes |
|---|---|---|---|---|
| 1 | 010*, 01100*, 01101* | 0100*, 01000*, 01100*, 01101* | 4 | 0*, 01100*, 01101* |
| 2 | 0*, 10*, 110100* | 0*, 0110*, 10*, 110100* | 4 | 0*, 10*, 110100* |
| 3 | 1* | 110101*, 1101*, 11011*, 110111* | 4 | — |

METHOD AND APPARATUS FOR PERFORMING NETWORK ROUTING WITH USE OF POWER EFFICIENT TCAM-BASED FORWARDING ENGINE ARCHITECTURES

FIELD OF THE INVENTION

The present invention relates generally to the field of packet-based data networks and more particularly to a method and apparatus for performing network routing (or other data packet categorization functions) with use of forwarding engines (or other lookup engines) based on power efficient TCAM (Ternary Content Addressable Memory) architectures.

BACKGROUND OF THE INVENTION

Ternary Content-Addressable Memories (TCAMs) are becoming very popular for designing high-throughput forwarding engines on routers—they are fast, cost-effective and simple to manage. Specifically, TCAMs are fully associative memories that allow a "don't care" state to be stored in each memory cell in addition to 0s and 1. This feature makes them particularly attractive for packet classification and route lookup applications that require longest prefix matches. For example, when a destination address is presented to the TCAM, each TCAM entry may be looked up in parallel, and the longest prefix that matches the address is returned. Thus, a single TCAM access is sufficient to perform a complete route lookup operation. In contrast, conventional ASIC-based designs that use routing tries may require many memory accesses for a single route lookup. (As is well known to those skilled in the art, a routing trie is a tree-based data structure used to store routing prefixes for use in longest prefix matching.) Thus, routing latencies for TCAM-based routing tables are significantly lower than they are for ASIC-based tables. Moreover, TCAM-based tables are typically much easier to manage and update than tables implemented using tries.

Despite these advantages, routing vendors have been slow in adopting TCAM devices in packet forwarding engines for at least two reasons. First, TCAM devices have traditionally been more expensive and less dense compared to conventional ASIC-based devices. However, both the density and the cost of TCAMs have dramatically improved in the past few years, making them a viable alternative to ASIC-based designs in high-speed core routers. The second reason is that of high power consumption. Current high-density TCAM devices consume as much as 12 to 15 Watts each when all of the TCAM memory entries are enabled for search. Moreover, a single linecard may require multiple TCAMs to handle filtering and classification as well as IP lookups on large forwarding tables. This high power consumption number affects costs in two ways—first, it increases power supply and cooling costs that account for a significant portion of the operational expenses for an ISP (Internet Service Provider), and second, it reduces port density since higher power consumption implies that fewer ports can be packed into the same space (e.g., a router rack) due to cooling constraints. Therefore, it is important to significantly reduce the power requirements of TCAM-based forwarding engines (and other lookup engines) to make them economically viable.

SUMMARY OF THE INVENTION

Recently, certain TCAM vendors have begun to provide mechanisms for searching only a part of a TCAM device in order to provide for reduced power consumption during certain lookup operations. Specifically, these vendors have provided for the selective addressing of separate portions of the TCAM (referred to as "sub-tables"), and have suggested that each sub-table (or groupings thereof) might be used for different lookup/classification applications, such as, for example, IPv4 lookups, IPv6 lookups, flow classification, etc. (IPv4 and IPv6 represent Internet Protocol versions 4 and 6, respectively, and are each fully familiar to those of ordinary skill in the art.) However, we have realized that a novel TCAM-based architecture for IP (Internet Protocol) lookup tasks (such as routing, classification, etc.) can be advantageously obtained by taking further advantage of this selective addressing feature to thereby provide more power efficient forwarding engines (and other lookup engines) than were heretofore possible.

Specifically, in accordance with the principles of the present invention, a TCAM is advantageously divided into a plurality of partitions, each partition comprising one or more TCAM sub-tables, and packet-based lookups are performed with use of a multi-stage (e.g., two-stage) lookup process. In particular, when a lookup is to be performed (based on information contained in the packet header of a given packet), a first stage of the lookup is performed (e.g., within a first one of these TCAM partitions, with a separate memory lookup device, or with a separate logic module), and then, the results of the first stage lookup are advantageously used to selectively search one of the (other) TCAM partitions during a subsequent stage of the lookup process. Illustratively, the packet header information comprises a packet destination, and the result of the second stage lookup comprises packet routing information (such as, for example, "next-hop" information).

In accordance with certain illustrative embodiments of the present invention, a subset of the destination address bits are advantageously used in the first lookup stage to hash to a TCAM partition for use in the second stage. This approach provides for a very simple hardware implementation and will be referred to herein as the "bit-selection" architecture. The selected bits may be advantageously fixed based on the contents of a routing table.

In accordance with other illustrative embodiments of the invention, a partitioning algorithm may be advantageously employed to segment a routing trie into a plurality of partitions for use with the two-stage lookup process. In particular, a small trie—advantageously implemented using either a separate, small TCAM or one of the partitions (e.g., sub-trees) of the partitioned TCAM—is used to map a prefix of the destination address to one of the TCAM partitions for use by the second stage. These approaches, referred to herein as the "trie-based" architectures, add some design complexity, but advantageously result in significantly better worst-case power consumption.

And in accordance with certain ones of those illustrative embodiments in which a "trie-based" architecture is employed, novel partitioning algorithms are provided whereby a routing trie is advantageously partitioned based on a post-order traversal of the routing trie such that each of the aforementioned second stage partitions comprises a set of prefixes associated with one or more corresponding trie nodes encountered during said post-order traversal, together with one or more covering prefixes thereof. (As is well known to those of ordinary skill in the art, a "post-order traversal" of a tree is a depth-first traversal in which descendant nodes precede ancestor nodes in the ordering. In addition, for any node u in a routing trie, the prefix of the lowest common ancestor of u, including u itself, that is in the routing table, is referred to herein as the "covering prefix" of node u.) In particular, two of these novel partitioning algorithms, as provided in accordance with each of two illustrative embodiments of the present invention, are described in detail below and are specifically referred to herein as the "subtree-split" partitioning algorithm and the "postorder-split" partitioning algorithm, respectively.

BRIEF DESCRIPTION OF THE DRAWINGS

FIG. 4 shows an illustrative routing table (FIG. 4A) and a corresponding 1-bit routing trie (FIG. 4B) for use by the illustrative TCAM-based forwarding engine of FIG. 3.

FIG. 7 shows an illustrative example of a routing trie being partitioned with use of the illustrative "subtree-split" partitioning algorithm of FIG. 5; FIGS. 7A-7D show four steps of the partitioning process and FIG. 7E shows the partitioning resulting therefrom.

FIG. 10 shows an illustrative example of a routing trie being partitioned with use of the illustrative "postorder-split" partitioning algorithm of FIG. 8; FIGS. 10A-10C show three steps of the partitioning process and FIG. 10D shows the partitioning resulting therefrom.

DETAILED DESCRIPTION

Summary Review of TCAM Use in Forwarding Engine Address Lookups

A Ternary Content Addressable Memory (TCAM) is a fully associative memory that allows a "don't care" state for each memory cell, in addition to a "0" and a "1". A memory cell in a "don't care" state matches both a "0" and a "1" in the corresponding input bit. The contents of a TCAM can be searched in parallel and a matching entry, if it exists, can be found in a single cycle (i.e., using a single TCAM access). If multiple entries match the input, the entry with the lowest address in the TCAM is typically returned as the result.

The characteristics described above make TCAMs an attractive technology for packet-based network lookup operations, such as IP route lookups in which the destination address of an incoming packet is matched with the "longest matching prefix" in a routing table database in order to obtain "next-hop" routing information. In particular, TCAMs can be illustratively used to implement such routing table lookups as follows. If the maximum prefix length is W, then each routing prefix of length $n \leq W$ is stored in the TCAM with the rightmost W−n bits as "don't care" bits. For example, the IPv4 prefix "192.168.0.0/15" will have "don't care" bits in the last 17 bit positions. To ensure that the longest prefix match is returned, the prefixes in the TCAM may be advantageously sorted in order of decreasing prefix length. (Note that even though such a sorting requirement may make it more difficult to update the routing table, recent developments have provided innovative algorithms for performing such TCAM updates simply and efficiently.)

However, as pointed out above, the power consumption issue has heretofore remained unresolved. Note that the main component of power consumption in TCAMs is proportional to the number of searched entries. For example, a typical 18 Mbit TCAM device can consume up to 15 Watts of power when all of the entries are searched. And growth trends in the routing tables in the Internet core have prompted routing vendors to design routing engines capable of scaling up to 1 million entries. And since an 18 Mbit TCAM can store up to 512K 32-bit prefixes, this translates to using at least 2 TCAM devices for IPv4 forwarding alone. After adding more TCAM devices for flow classification and IPv6 forwarding, it can be seen how TCAM power consumption on a linecard can become a major cost overhead.

TCAM vendors today have started providing mechanisms that can reduce power consumption by selectively addressing smaller portions of the TCAM. Each portion (typically called a "sub-table" or database) is defined as a set of TCAM blocks. A TCAM block is a contiguous, fixed-sized chunk of TCAM entries, usually quite a bit smaller than the size of the entire TCAM. For example, a 512K entry TCAM might, for example, be divided into 64 blocks containing 8K entries each. The sub-tables can then be defined as (possibly overlapping) subsets of the 64 blocks by using a 64-bit mask. When a search command is issued, a sub-table identifier (ID) may be specified along with the input—only the blocks in the specified sub-table are then advantageously searched. Typically, these TCAMs support a relatively small number of sub-tables (such as, for example, 8 sub-tables addressed by a 3-bit ID), but the same mechanism could be used to support a larger number of sub-tables as well. Typically, as pointed out above, each sub-table is intended for use in a different lookup/classification application, such as, for example, IPv4 lookups, IPv6 lookups, flow classification, etc.

As explained above and according to the principles of the present invention, this mechanism may be advantageously exploited to reduce power consumption for individual lookup applications such as, for example, route lookups, in accordance with various illustrative embodiments of the present invention. Given that the power consumption of a TCAM is proportional to the number of searched entries, we will herein use this number as a measure of the power consumed. Clearly, if the TCAM is partitioned into, say, K equally-sized sub-tables, it is possible in principle to reduce the maximum number of entries searched per lookup operation to as low as 1/K of the TCAM size.

A First Set of Illustrative Embodiments—the Bit Selection Architecture

In accordance with a first set of illustrative embodiments of the present invention, a "bit selection" architecture for TCAM-based packet forwarding engines is employed to perform two-stage routing. Specifically, the entire routing table is stored in the TCAM device split into multiple sub-tables "buckets", wherein each bucket is laid out over one or more TCAM blocks. Each route lookup is a two-stage operation where a fixed set of bits in the input is advantageously used to hash to one of the buckets. The selected bucket is then searched in the second stage. The hashing may, for example, be illustratively performed by some simple glue logic placed in front of the TCAM device (which will be referred to herein as the "data TCAM"). Illustratively, the hash function may be such that it simply uses the selected set of input bits (which will be referred to herein as the "hashing bits") as an index to the appropriate TCAM bucket.

It has been noted that a very small percentage of the prefixes in typical core routing tables are either very short (for example, less than 16 bits) or very long (for example, greater than 24 bits). Therefore, in accordance with the first illustrative embodiment of the present invention, an architecture is advantageously employed wherein very short and very long prefixes are grouped into the minimum possible number of TCAM blocks. These blocks are then searched for every lookup. The remainder of the prefixes that are, for example, between 16 and 24 bits long are then advantageously partitioned into buckets, one of which is selected by hashing for each lookup.

Figure 1:
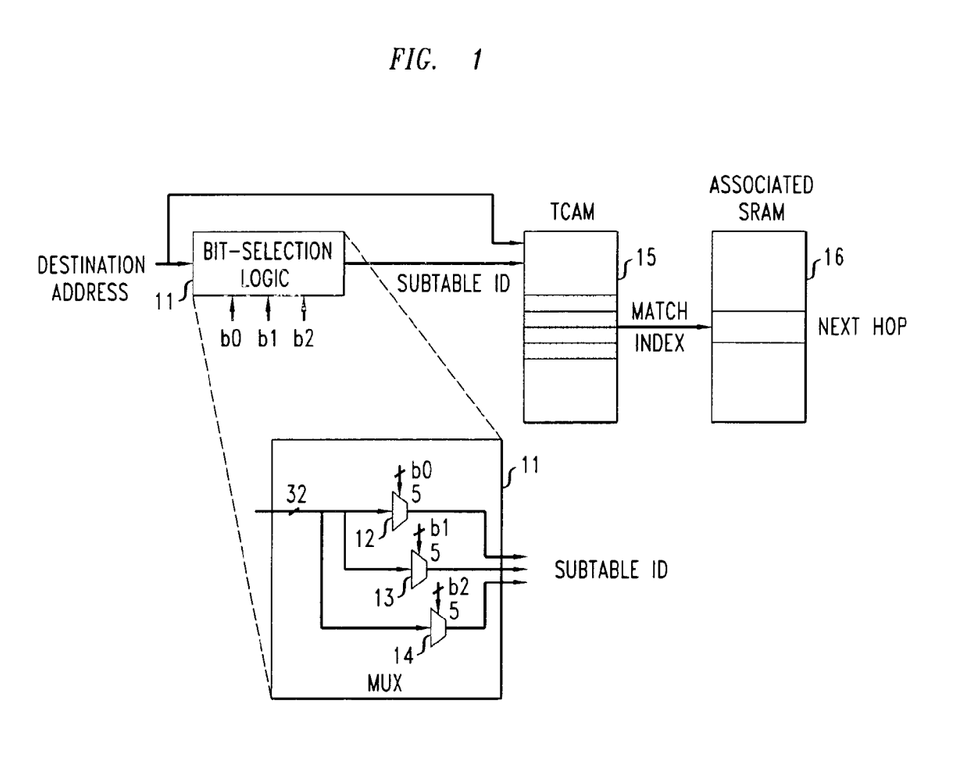
FIG. 1 shows an illustrative TCAM-based forwarding engine using a bit-selection architecture to reduce power in accordance with certain illustrative embodiments of the present invention.

FIG. 1 shows an illustrative TCAM-based forwarding engine using a bit-selection architecture to reduce power in accordance with certain illustrative embodiments of the present invention. (Note that the TCAM blocks containing the very short and very long prefixes are not explicitly shown.) Illustratively, bit-selection logic module 11, placed in front of TCAM 15, may comprise a set of multiplexers (e.g., multiplexers 12, 13 and 14) that can be programmed to extract the hashing bits from the incoming packet header. These hashing bits may then be used as the sub-table ID for use in indexing to the appropriate bucket in TCAM 15. Note that only a portion of the TCAM—namely, the indexed bucket (shown shaded in the figure)—is advantageously searched (i.e., activated).

The resulting match from TCAM 15 may then be used as an index into SRAM 16 in order to retrieve the "next hop" information for use in routing the given data packet. As illustratively shown in the figure, the 3 hashing bits are selected from the 32-bit destination address by setting the appropriate 5-bit values for b0, b1 and b2. (In other words, the set of hashing bits can be advantageously changed over time by reprogramming the multiplexers.)

For purposes of the discussion herein, the following assumptions will be made (although it will be obvious to those of ordinary skill in the art that the illustrative embodiments described herein may be easily extended to remove such assumptions). First, we will only consider the set of 16 to 24 bit long prefixes (referred to herein as the "split set") for partitioning. Second, it is possible that the routing table will span multiple TCAM devices, which would then be attached in parallel to the bit selection logic. However, each lookup would still require searching a bucket in a single TCAM device. Thus, for simplicity, we will assume that there is only one TCAM device. Third, we will assume that the total number of buckets $K=2^k$ is a power of 2. Thus, the bit selection logic advantageously extracts a set of k hashing bits from the packet header and selects a prefix bucket. This bucket, along with the TCAM blocks containing the very short and very long prefixes, are then searched.

The two main issues now are how to select these k hashing bits, and how to allocate the different buckets among the various TCAM blocks. (Recall that the bucket size may not be an integral multiple of a TCAM block size.) The first issue leads to our final assumption—we will restrict ourselves to choosing the hashing bits from the first 16 bits, which is the minimum length of a prefix in the split set. (Otherwise, if, say, k' of the hashing bits are in bit positions longer than the length of a prefix, the prefix would need to be replicated in $2^{k'}$ buckets.)

Note that the "best" (i.e., most desirable) hash function—that is, set of hashing bits—is one that minimizes the size of the biggest resulting bucket, since this will, in turn, minimize the worst-case power consumption (since the worst-case power consumption of a TCAM is directly proportional to the size of the largest bucket). However, in general, the designer of a forwarding engine typically predetermines a "power budget," which comprises the maximum amount of power consumption that is to be permitted. Then, the hashing bits need to be chosen so that given such a power budget and a routing table, the set of selected hashing bits will produce a split that does not exceed the power budget. Such a split will be referred to herein as a "satisfying split."

In accordance with various illustrative embodiments of the present invention, any one or more of at least three different heuristics for choosing the set of hashing bits may be employed. After describing each of these three heuristics, it will be shown how they can be combined in an attempt to ensure a satisfying split in accordance with another illustrative embodiment of the present invention. Note that this methodology may be repeatedly applied when route updates occur.

In accordance with one illustrative embodiment of the present invention, a first heuristic, which will be referred to herein as the "simple" heuristic, requires no computation and merely uses the rightmost k bits from the first 16 bits. It has been (experimentally) determined that this often may be used to provide a satisfying split. In accordance with another illustrative embodiment of the present invention, a second heuristic uses a "brute force" search to check all possible subsets of k bits from the first 16 bits, with the first hashing set that satisfies the given power budget being selected.

Specifically, the brute force method operates as follows. Since only the first 16 bits of all prefixes are considered, each 16-bit combination found in the table is advantageously given a weight representing the number of 16 to 24 bit prefixes that share those first 16 bits. Note that the total number (say E) of such 16-bit weighted entries is at most $2^{16}$. To find the best k bits using brute force, all of the combinations (of k out of 16) may be examined. Each combination involves one pass over all of the E 16-bit entries.

Finally, in accordance with another illustrative embodiment of the present invention, a third heuristic comprises a "greedy" algorithm that falls between the brute force heuristic and the simple heuristic in terms of computation as well as accuracy. Specifically, in order to select the k hashing bits, the greedy algorithm performs k iterations, selecting one hashing bit per iteration. Thus, the number of buckets (i.e., partitions of the routing table) doubles in each iteration. The goal in each iteration is to select a bit that minimizes the size of the biggest bucket produced by the 2-way split in that iteration.

Figure 2:
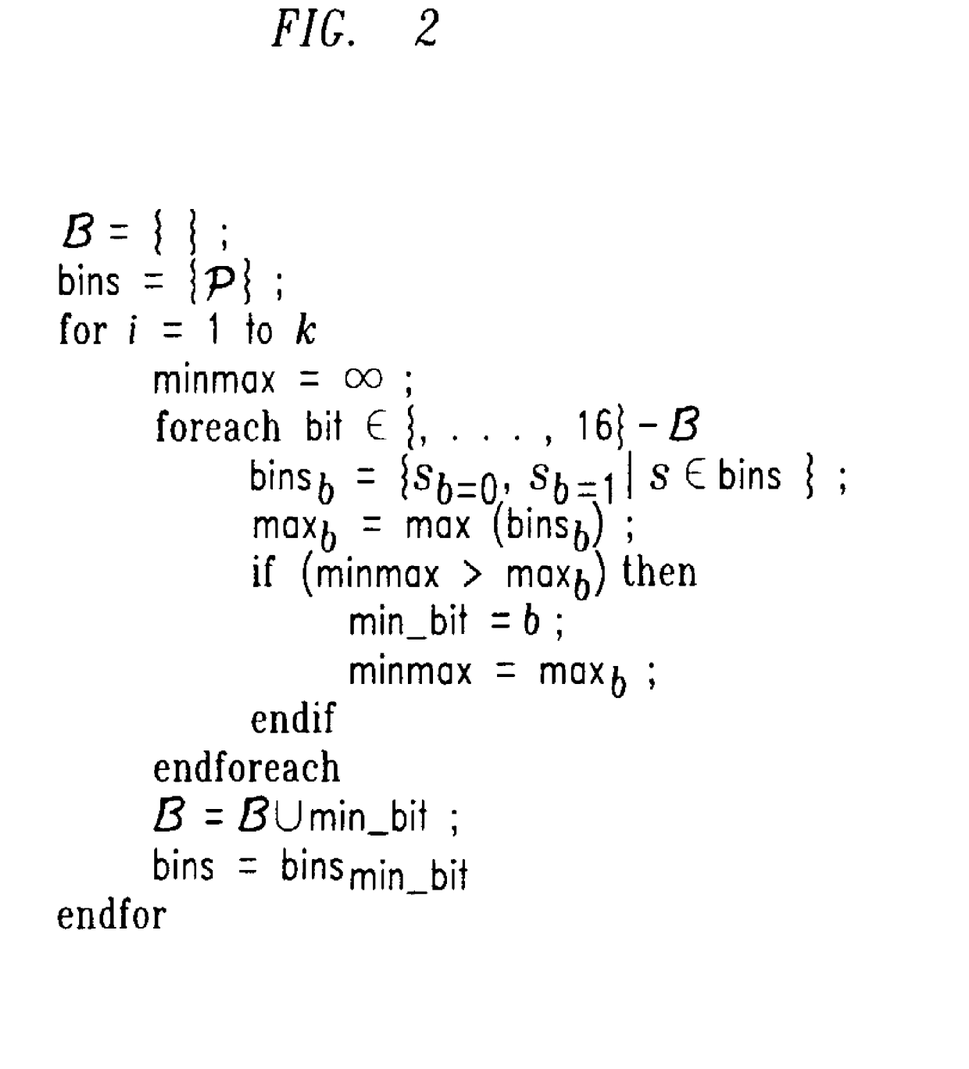
FIG. 2 shows illustrative program code for implementing a "greedy" algorithm for choosing hashing bits in accordance with one illustrative embodiment of the present invention for use with the illustrative TCAM-based forwarding engine using a bit-selection architecture as shown in FIG. 1.

FIG. 2 shows illustrative program code for implementing such a "greedy" algorithm for selecting k hashing bits for a satisfying split, in accordance with one illustrative embodiment of the present invention. Referring to the figure, note that B is the set of bits selected and P is the set of all prefixes in the routing table. Also note that $s_{b=j}$ denotes the subset of prefixes in set s that have a value of j (where j=0 or 1) in bit position b.

In accordance with one illustrative embodiment of the present invention, a scheme that advantageously combines each of these three heuristic approaches to performing the bit-selection procedure is provided. Specifically, the following steps are performed:

1. The routing prefixes are split using the last k of their first 16 bits. If this produces a satisfying split, stop.
2. Otherwise, the greedy heuristic is applied to find a satisfying split using k hashing bits. If this produces a satisfying split, stop.
3. Otherwise, the brute force heuristic is applied to find a satisfying split using k hashing bits.

Note that in accordance with these illustrative embodiments of the present invention, each of these above-described techniques for performing the split are advantageously re-applied whenever route updates change the prefix distribution in the routing table such that the size of the largest bucket exceeds the desired amount (i.e., the amount that results from the specified power budget). Note that for typical routing tables, it is expected that such re-computations will not be necessary very often.

Finally, the buckets that have been determined by the above-described techniques (corresponding, for example, to a satisfying split) are laid out on the TCAM blocks in accordance with one illustrative embodiment of the present invention as follows. First, the blocks containing the very long prefixes (e.g., those greater than 24 bits) and those containing the very short prefixes (e.g., those less than 16 bits) are placed at the beginning of the TCAM and at the end of the TCAM, respectively. Doing so ensures that the longest prefix is selected in the event of multiple matches, assuming that the TCAM selects the first match found (as is typical). Then, in accordance with this illustrative embodiment of the present invention, the buckets containing the intermediate length prefixes (e.g., those containing between 16 and 24 bits) are laid out sequentially (in any order) in the TCAM, advantageously ensuring that all the prefixes in one bucket are in contiguous locations.

A Second Set of Illustrative Embodiments—the Trie-Based Architecture

In accordance with a second set of illustrative embodiments of the present invention, a "trie-based" architecture for TCAM-based packet forwarding engines is employed to perform two-stage routing. Specifically, these embodiments advantageously make use of a routing tree (i.e., a "trie") data structure for partitioning the routing table into TCAM buckets. In accordance with at least two of these illustrative embodiments, one of two novel partitioning schemes—the "subtree-split" algorithm and the "postorder-split" algorithm (each of which is described in detail below)—is employed for partitioning the trie in an advantageous manner for use by the illustrative TCAM-based forwarding engine.

Figure 3:
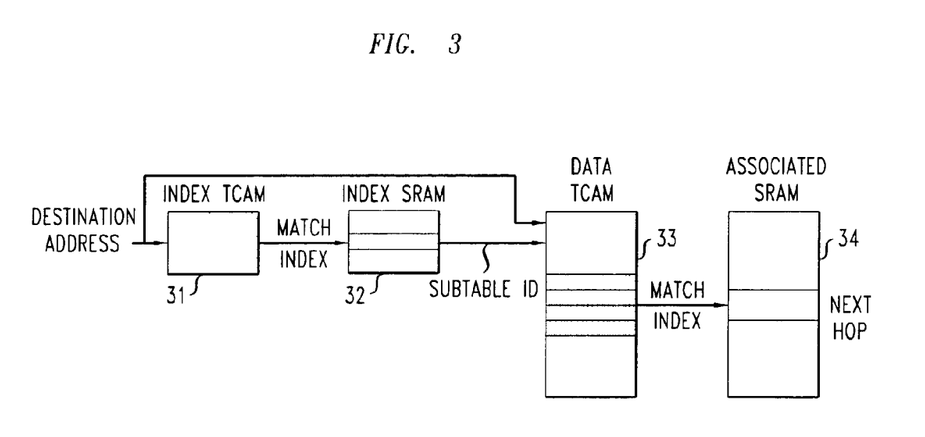
FIG. 3 shows an illustrative TCAM-based forwarding engine using a trie-based architecture to reduce power in accordance with certain other illustrative embodiments of the present invention.

FIG. 3 shows an illustrative TCAM-based forwarding engine using a trie-based architecture to reduce power in accordance with certain illustrative embodiments of the present invention. Note that the primary difference between the bit-selection architecture described above and the trie-based architecture is that the latter uses a "first-level" prefix trie (Index TCAM 31 and Index SRAM 32) in the first stage lookup process rather than hashing on a set of input bits. This makes use of some additional hardware, as shown in the figure.

In accordance with the illustrative forwarding engine shown in FIG. 3, each input is first matched with respect to index TCAM 31, which is an initial, relatively small TCAM (containing the "first-level" trie) which indexes into an associated SRAM—namely, index SRAM 32. In particular, index SRAM 32 contains an identifier (i.e., the ID) that specifies the particular TCAM bucket (which was obtained as a result of one of the aforementioned partitioning schemes) that is to be searched in the second stage lookup. Obviously, this lookup process requires the entire index TCAM (shown fully shaded in the figure) to be searched every time. (However, note that the index TCAM is typically quite small in size compared to the data TCAM, and therefore does not contribute significantly to the power budget.) Given the sub-table ID as retrieved from index SRAM 32, data TCAM 33 is searched, but advantageously in the selected sub-table only (shown shaded in the figure), and the resulting match is then used as an index into SRAM 34 to retrieve the "next hop" information.

In accordance with the illustrative embodiment of the present invention shown in FIG. 3, the index TCAM and the data TCAM are implemented with use of separate (physical) TCAM devices. However, in accordance with other illustrative embodiments of the present invention, the index TCAM functionality may be implemented with use of one or more of the sub-tables of the data TCAM itself. The implementation details of such an illustrative embodiment will be obvious to those of ordinary skill in the art.

Note that as with the bit-selection architecture, a large routing table can in general be laid out across multiple data TCAMs connected in parallel, in which case each address lookup involves searching exactly one bucket in one of these data TCAMs. For the purposes of the illustrative embodiments described herein, it shall be assumed (for purposes of simplicity) that there is only one data TCAM. It will be obvious to those of ordinary skill in the art that the embodiments described herein can be easily extended to the case where there are multiple data TCAMs.

Each of the illustrative trie-based partitioning schemes presented herein advantageously operate in two steps. First, a binary routing trie (also known as a "1-bit trie") is constructed using the routing table. Then, in the second step, subtrees or collections of subtrees of the 1-bit trie are successively carved out and mapped to individual TCAM buckets. This will be referred to herein as the "partitioning step". The two novel partitioning schemes presented herein differ in their partitioning step.

We will first present a brief overview of 1-bit tries and some of their properties, all of which is well known to those of ordinary skill in the art. A 1-bit trie may be advantageously used for performing longest prefix matches. It consists of a collection of nodes, where a routing prefix of length n is stored at a node in level n of the trie. When presented with an input, the typical lookup process starts from the root, scans the input from left to right and descends the left or the right branch whenever the next bit in the input is a 0 or a 1, respectively, until a leaf node, representing a prefix, is encountered. This process thereby traces a path from the root node to the longest prefix that matches the input. For any node v, the prefix denoted by the path from the root to v is referred to herein as the "prefix" of v, and the number of routing table prefixes in the subtree rooted at v is referred to herein as the "count" of v.

Figure 4A:
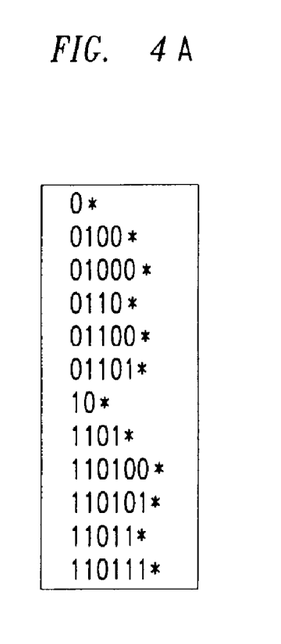
Figure 4B:
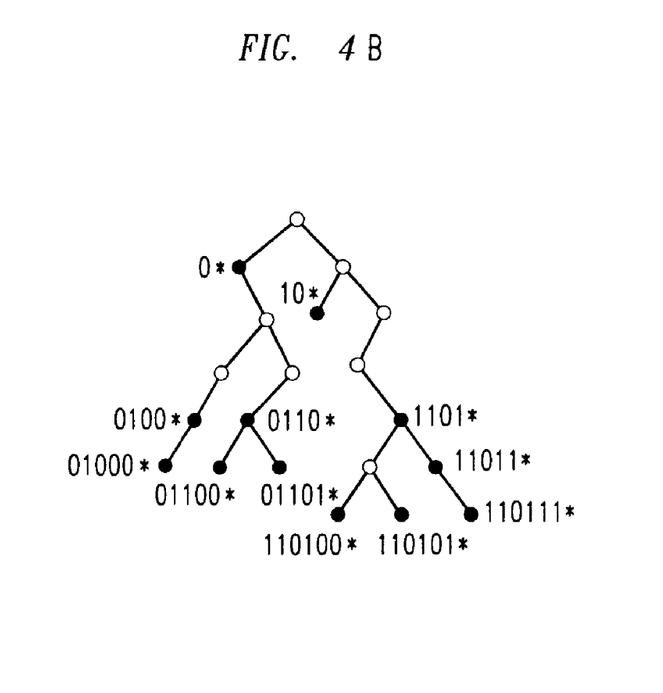

Note that every node in the 1-bit trie will necessarily have a non-zero count, since a node appears in the trie only if the subtree rooted at that node contains at least one prefix. Therefore, the prefix of a leaf node will necessarily be in the routing table. However, on the other hand, the prefix of an intermediate node may not be in the routing table. For any node u, the prefix of the lowest common ancestor of u (including u itself) that is in the routing table will be referred to herein as the "covering prefix" of u. The covering prefix of a node will be defined to be "nil" if there are no nodes in the path to the root whose prefix is in the routing table. FIG. 4 shows an illustrative routing table (FIG. 4A) and a corresponding 1-bit routing trie (FIG. 4B) for use by the illustrative TCAM-based forwarding engine of FIG. 3. Note that the prefixes of only the shaded nodes are in the routing table.

A First Illustrative Trie-Based Partitioning Technique—the Subtree-Split Algorithm In accordance with one illustrative embodiment of the present invention, a trie-based partitioning method—referred to herein as the "subtree-split" algorithm—is provided for use with the illustrative trie-based architecture of FIG. 3. This algorithm takes as its input a parameter b that denotes the maximum size of a TCAM bucket (in terms of number of prefixes), and produces as its output a set of K TCAM buckets and an index TCAM of size K. Advantageously, each of the K∈[[N/b], [2N/b]] TCAM buckets has a size in the range [[b/2],b]. (Note that to split N prefixes into K buckets, the illustrative algorithm may be advantageously executed with parameter b set equal to [2N/K].)

During the partitioning step, the entire trie is advantageously traversed in post order looking for what will be referred to herein as a "carving node". In particular, a carving node is a node v whose count is at least [b/2] and whose parent exists and has a count greater than b. Each time a carving node v is encountered, the illustrative subtree-split algorithm carves out the entire subtree rooted at v and places it in a separate TCAM bucket. Next, the prefix of v is placed in the index TCAM, and the covering prefix of v is added to the TCAM bucket. Finally, the counts of all the ancestors of v are decreased by the count of v. In other words, once the subtree rooted at v is carved out, the state of the rest of the tree is advantageously updated to reflect that fact. When there are no more carving nodes left in the trie, the remaining prefixes (if any) are put in a new TCAM bucket with an index entry of "*" in the index TCAM. Note that the size of this last TCAM bucket is in the range [1, b].

Figure 5:
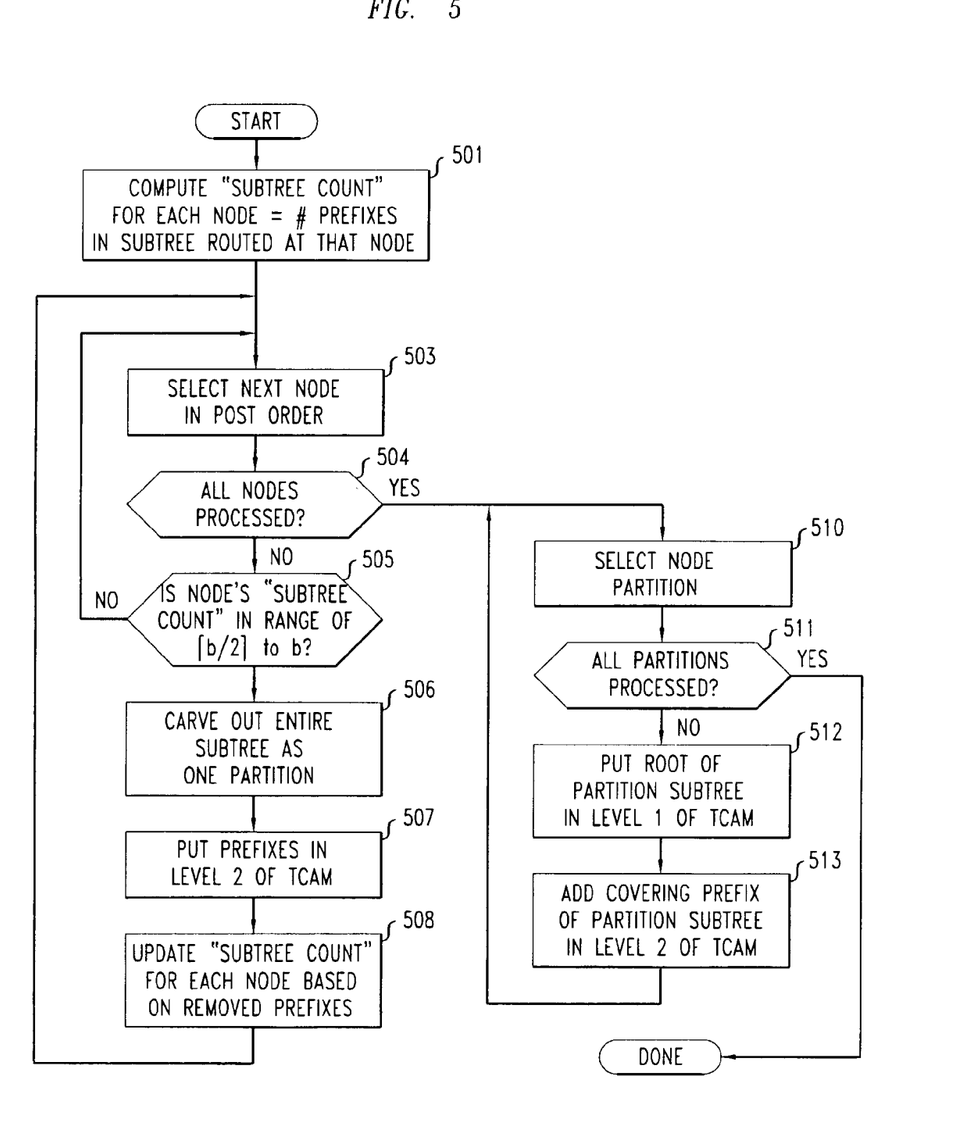
FIG. 5 shows a flowchart of an illustrative "subtree-split" partitioning algorithm for partitioning a routing trie for use by the illustrative TCAM-based forwarding engine of FIG. 3 in accordance with one illustrative embodiment of the present invention.

FIG. 5 shows a flowchart of an illustrative "subtree-split" partitioning algorithm for partitioning a routing trie for use by the illustrative TCAM-based forwarding engine of FIG. 3 in accordance with one illustrative embodiment of the present invention. Specifically, as shown in the figure, block 501 computes initial values of a set of "subtree count" variables, representing the number of prefixes in each subtree of the trie (i.e., in the subtree rooted at each node). Then, block 503 selects the "next" node in the trie, advantageously traversing the trie in "post order" (which is fully familiar to those of ordinary skill in the art), unless, of course, all such nodes have already been processed (as is tested by decision block 504).

Given a selected node, decision block 505 checks to see if the "subtree count" of the given node is within the required range (i.e., between [b/2] and b), and if it is not, control returns to block 503 to select and test the next node. If, on the other hand, decision block 505 determines that the "subtree count" of the given node is within the required range, block 506 carves out the entire subtree (rooted at the given node) as one partition; block 507 puts all of the prefixes included in the carved-out subtree into level two of the TCAM (i.e., in the given level two partition); block 508 updates the "subtree count" values (to account for the removed prefixes); and control returns to block 503 to search for the next partition.

When all nodes have been processed (as determined by decision block 504), block 510 selects one of the generated partitions, unless all of the partitions have been processed (as is tested by decision box 511). Then, block 512 puts the root of the subtree (carved out as the given partition) into level one of the TCAM, and block 513 adds the "covering prefix" of the subtree to the level 2 TCAM partition built by block 507 above. When all partitions have been processed (as determined by decision box 511), the procedure is complete.

Figure 6:
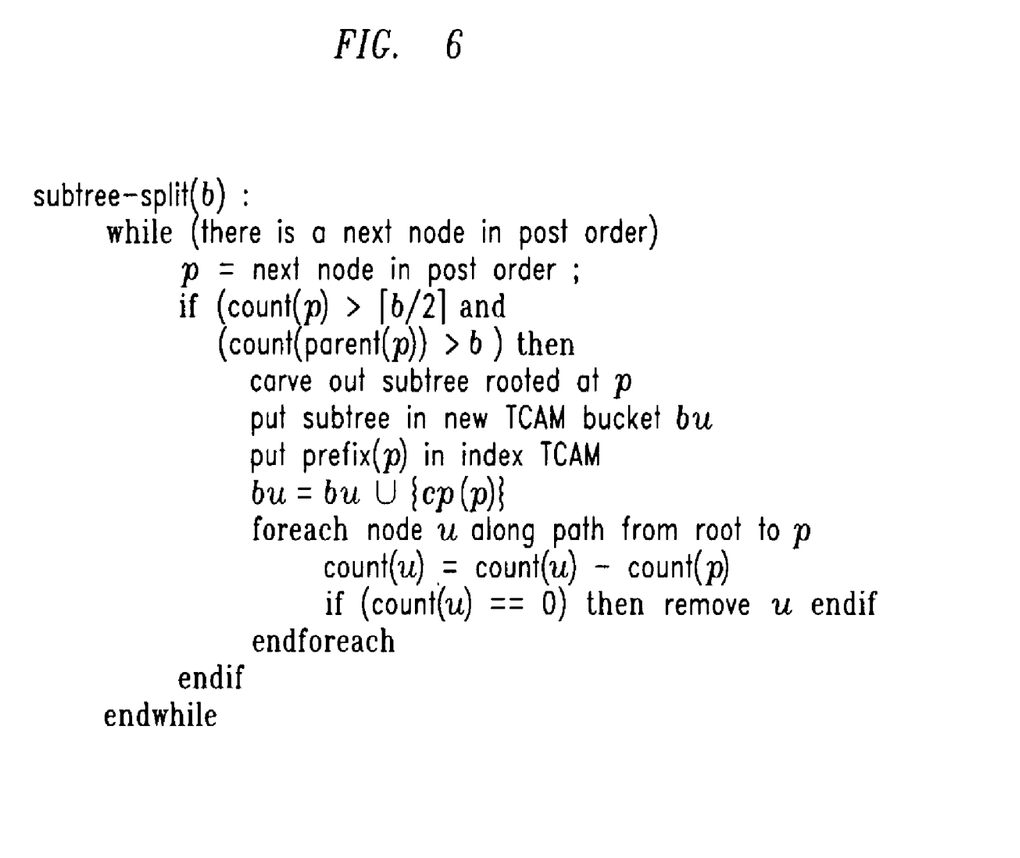
FIG. 6 shows illustrative program code for implementing a "subtree-split" partitioning algorithm in accordance with one illustrative embodiment of the present invention.
Figure 7A:
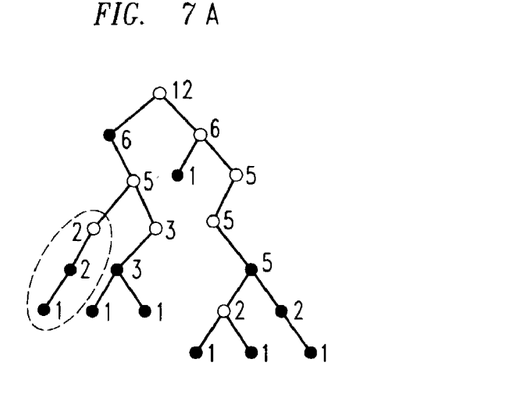
Figure 7B:
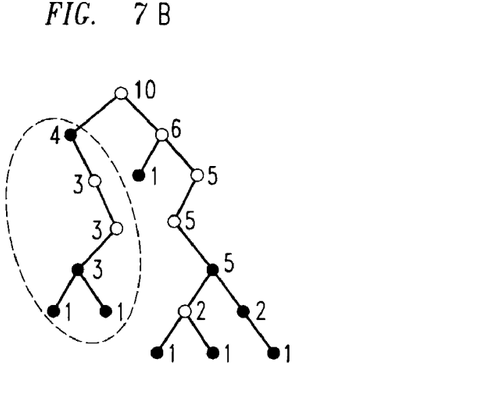
Figure 7C:
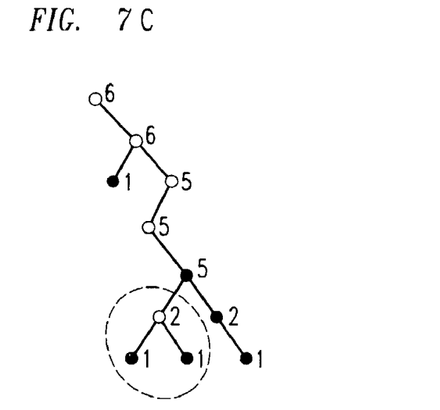
Figure 7D:
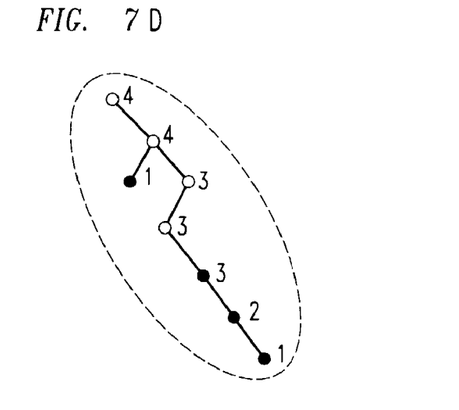
Figure 7E:
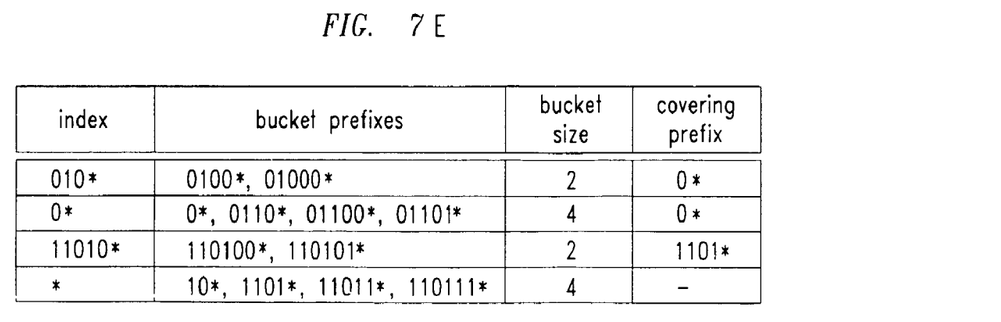

FIG. 6 shows illustrative program code for implementing an illustrative "subtree-split" partitioning algorithm in accordance with one illustrative embodiment of the present invention. Referring to the figure, note that count(p) is the number of prefixes remaining under node p, prefix(p) is the prefix of node p, parent(p) is the parent node of node p in the 1-bit trie, and cp(p) is the covering prefix of node p. The operation of the illustrative program code of FIG. 6 will be clear to those of ordinary skill in the art.

FIG. 7 shows an illustrative example of a routing trie being partitioned with use of the illustrative "subtree-split" partitioning algorithm of FIG. 5, using the illustrative routing trie shown in FIG. 4. Specifically, four iterations of the algorithm (with parameter b set to 4) are shown (in FIGS. 7A-7D, respectively) as applied to the trie of FIG. 4. The number shown at each node u denotes the current value of count(u). The arrows show the path along which count(u) is updated in each iteration, while the dashed outline denotes the subtree that is being carved out of the trie. The table (as shown in FIG. 7E) shows the five resultant buckets. As pointed out above, bucket sizes vary between b/2 and b prefixes. The covering prefix of each bucket, if not already in the bucket, is finally added to it.

Note that the index (root) for a carved subtree need not hold a prefix from the routing table. Hence the index TCAM may include prefixes not in the original routing table. In such a case, they merely serve as pointers to the buckets in the data TCAM that contains the corresponding routing table prefixes. Therefore an input address that matches an entry in the index TCAM may have no matching prefix in the corresponding subtree. The addition of the covering prefix to a bucket ensures that a correct result is returned in such a case. For example, for the partitioning shown in FIG. 7, the input address "01011111" matches "010*" in the index TCAM, but has no matching prefix in the corresponding subtree. The covering prefix "0*" is the correct longest matching prefix for this input.

Since the algorithm performs a post order traversal of the trie, the subtree indices are advantageously added to the index TCAM in the order that the corresponding subtrees were carved out. In other words, the first subtree index advantageously has the highest priority (i.e., the lowest address) in the index TCAM, while the last subtree index advantageously has the lowest priority. Finally, each bucket can be laid out in the data TCAM as described above in connection with the illustrative bit-selection architecture embodiments of the invention.

A Second Illustrative Trie Partitioning Method—the Postorder-Split Algorithm

One disadvantage of the subtree-split algorithm described above is that the smallest and largest bucket sizes may vary by as much as a factor of two. In accordance with another illustrative embodiment of the present invention, another trie partitioning algorithm—the postorder-split algorithm—is provided in which the bucket sizes are advantageously of a constant size. Once again, let N be the total size of a routing table, and let b be the desired size of a TCAM bucket. The postorder-split algorithm advantageously partitions the routing table into buckets that each contain exactly b prefixes (except possibly the last bucket). However, a larger number of entries in the index TCAM may result, as compared to the subtree-split algorithm described above. (Note that to split N prefixes of maximum length W into K buckets, the illustrative algorithm may be advantageously executed with parameter b set equal to $\lceil N/K \rceil$.)

Specifically, the postorder-split algorithm is similar to the subtree-split algorithm, in that it takes as its input a 1-bit trie (constructed from a routing table) and then traverses the trie in post-order, carving out subtrees to put in TCAM buckets. However, since it is possible that the entire trie does not contain $\lceil N/b \rceil$ subtrees with exactly b prefixes each (and since each resulting TCAM bucket is to be of size b), a bucket here is constructed from a collection of subtrees which together contain exactly b prefixes, rather than from a single subtree (as in the case of the illustrative subtree-split algorithm described above). Consequently, the corresponding entry in the index TCAM may, in general, have multiple indices that point to the same TCAM bucket in the data TCAM. Each such index is the root of one of the subtrees that constitutes the TCAM bucket.

Figure 8:
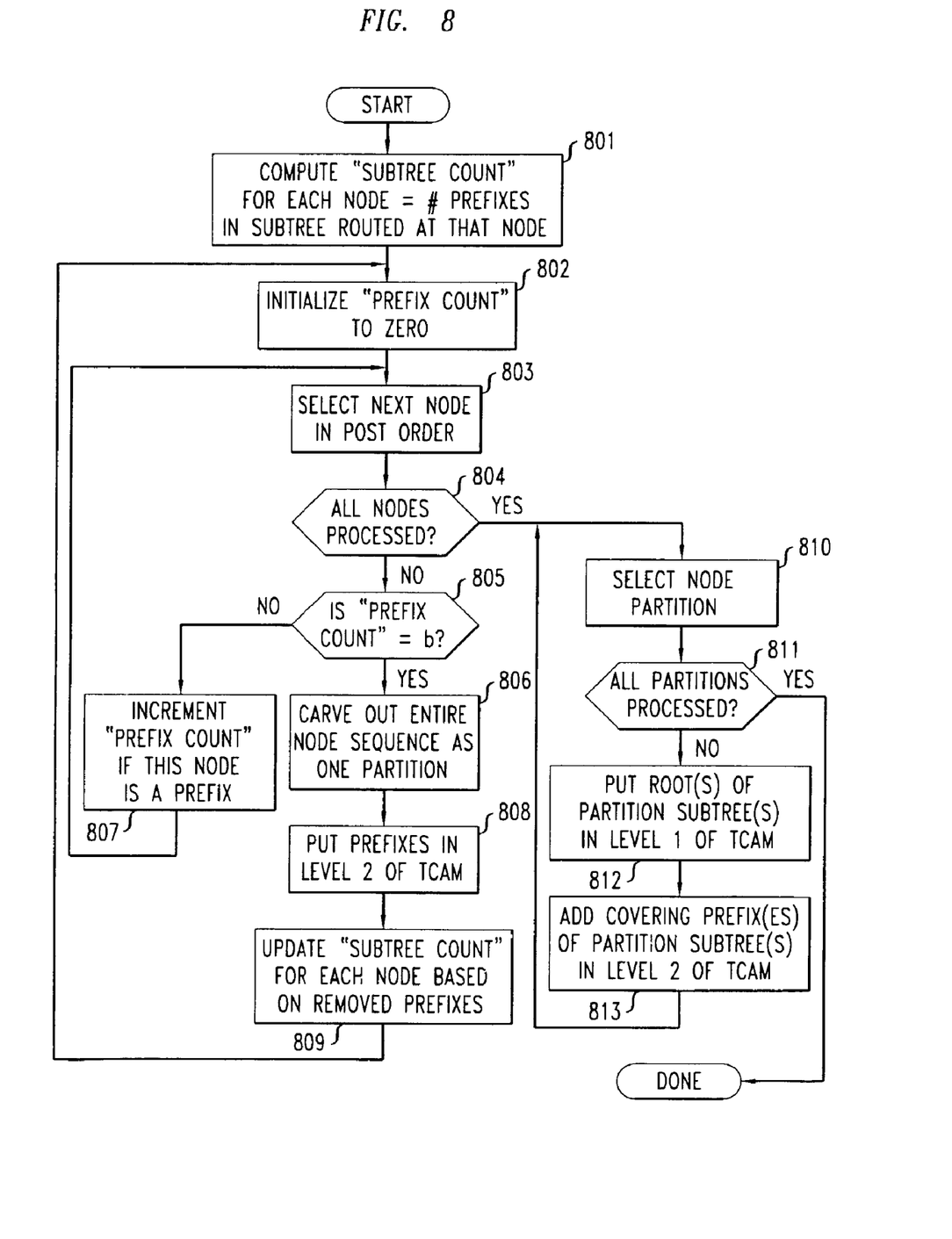
FIG. 8 shows a flowchart of an illustrative "postorder-split" partitioning algorithm for partitioning a routing trie for use by the illustrative TCAM-based forwarding engine of FIG. 3 in accordance with another illustrative embodiment of the present invention.

FIG. 8 shows a flowchart of an illustrative "postorder-split" partitioning algorithm for partitioning a routing trie for use by the illustrative TCAM-based forwarding engine of FIG. 3 in accordance with one illustrative embodiment of the present invention. Specifically, as shown in the figure, block 801 computes initial values of a set of "subtree count" variables, representing the number of prefixes in each subtree of the trie (i.e., in the subtree rooted at each node), and block 802 initializes a variable "prefix count" to zero. Then, block 803 selects the "next" node in the trie, advantageously traversing the trie in "post order" (which is fully familiar to those of ordinary skill in the art), unless, of course, all such nodes have already been processed (as tested by decision block 804).

Given a selected node, decision block 805 checks to see if the "prefix count" is yet equal to the partition size b, and if it is not, block 807 increments "prefix count" if the given node is, in fact, a prefix node, and control returns to block 803 to possibly add in the next node. If, on the other hand, decision block 805 determines that the "prefix count" has reached the value b, block 806 carves out the entire accumulated node sequence (since the last partition was carved out) as one partition; block 808 puts all of the prefixes included in the set of carved-out nodes into level two of the TCAM (i.e., in the given level two partition); block 809 updates the "subtree count" values (to account for the removed prefixes); and control returns to block 802 to reset "prefix count" and to build the next partition.

When all nodes have been processed (as determined by decision block 804), block 810 selects one of the generated partitions, unless all of the partitions have been processed (as is tested by decision box 811). Then, block 812 puts the root or roots of each subtree carved out as part of the given partition into level one of the TCAM, and block 813 adds "covering prefixes" of each such subtree to the level 2 TCAM partition built by block 808 above. When all partitions have been processed (as determined by decision box 811), the procedure is complete.

Figure 9:
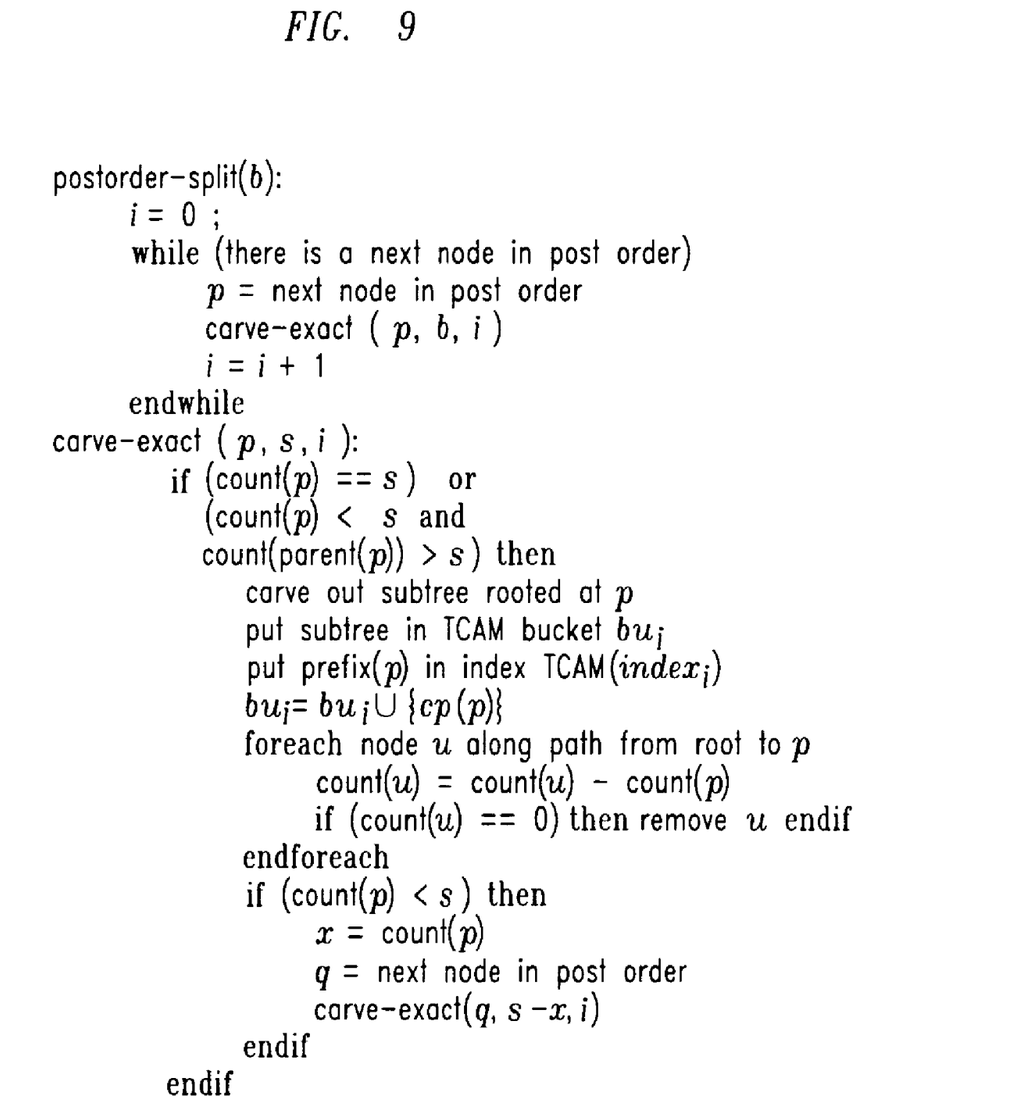
FIG. 9 shows illustrative program code for implementing a "postorder-split" partitioning algorithm in accordance with one illustrative embodiment of the present invention.
Figure 10A:
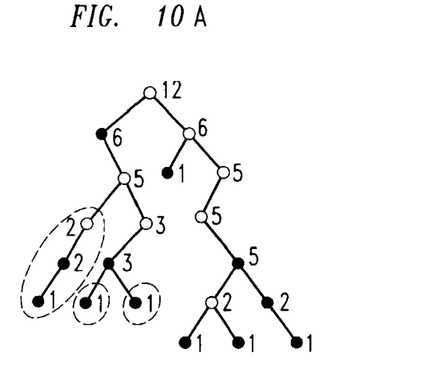
Figure 10B:
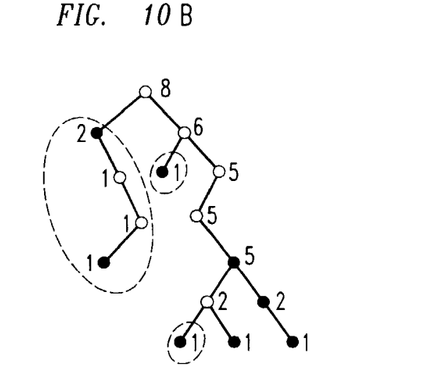
Figure 10C:
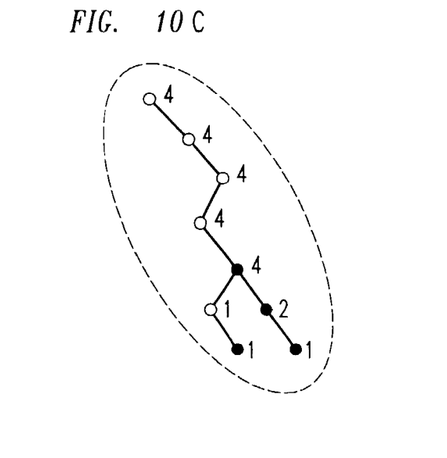
Figure 10D:
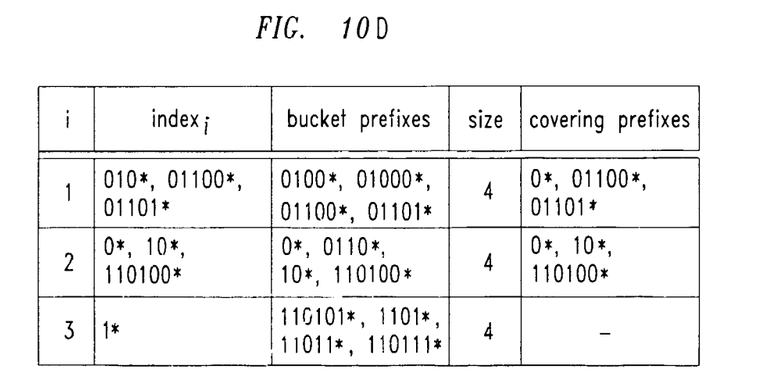

FIG. 9 shows illustrative program code for implementing an illustrative "postorder-split" partitioning algorithm in accordance with one illustrative embodiment of the present invention. Referring to the figure, note that count(p) is the number of prefixes remaining under node p, prefix(p) is the prefix of node p, parent(p) is the parent node of node p in the 1-bit trie, and cp(p) is the covering prefix of node p. Also, $index_i$ is the set of entries in the index TCAM that point to the bucket $bu_i$ in the data TCAM.

As can be seen from the illustrative program code of FIG. 9, the outer loop (i.e., procedure "postorder-split") traverses a 1-bit trie in post-order and successively carves out subtree collections that together contain exactly b prefixes. The inner loop (i.e., procedure "carve-exact") performs the actual carving—if a node v is encountered such that the count of v is b, a new TCAM bucket is created, the prefix of v is put in the index TCAM and the covering prefix of v is put in the TCAM bucket. However, note that if the count of v is x such that x<b and the count of v's parent is greater than b, then a recursive carving procedure is advantageously performed. Let the node next to v in post-order traversal be u. Then, the subtree rooted at u is traversed in post-order, and the algorithm attempts to carve out a subtree of size b−x from that subtree. In addition, the x entries are put into the current TCAM bucket (with a new one being created if necessary), and the prefix of v is added to the index TCAM and made to point to the current TCAM bucket. The covering prefix of v is also added to the current TCAM bucket. Finally, when no more subtrees can be carved out in this manner, the remaining prefixes, if any (noting that they must be less than b in number), are put into a new TCAM bucket and a "*" entry in the index TCAM points to the last bucket.

FIG. 10 shows an illustrative example of a routing trie being partitioned with use of the illustrative "postorder-split" partitioning algorithm of FIG. 8. Specifically, three iterations of the algorithm (with parameter b set to 4) are shown (in FIGS. 10A-10C, respectively) as applied to the trie of FIG. 4. The number shown at each node u denotes the current value of count(u). The arrows show the path traced to the root in each iteration for decrementing count, and the dashed outlines denote the set of subtrees carved out. The table (as shown in FIG. 10D) shows the three resulting buckets. Note that each bucket has b=4 prefixes. The covering prefixes of each bucket (as shown) that are not in the bucket are added to the bucket in the data TCAM.

Note that the postorder-split algorithm may, in general, add more than one index (and covering) prefix per TCAM bucket. Note that the number of prefixes added to the index TCAM for any given TCAM bucket is equal to the number of times the carve-exact procedure is called recursively to create that bucket. It is possible to show that each time carve-exact is called for this bucket, we descend one level down in the 1-bit trie (except, possibly, for the last invocation of carve-exact). Therefore, the maximum number of times that the carve-exact procedure can be called is W+1, where W is the maximum prefix length in the routing table. Thus, for each bucket in the data TCAM, the postorder-split algorithm adds at most W+1 entries to the index TCAM. In addition, the algorithm adds at most W covering prefixes to each bucket in the data TCAM.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope.

For example, although the illustrative embodiments of the present invention which have been described herein describe a two-level lookup process, it will be obvious to those skilled in the art that the principles of the present invention can be easily extended to providing a multi-level lookup process for any number of levels greater than one. In addition, although the illustrative embodiments of the present invention described herein are focused on IPv4 address lookups, other illustrative embodiments of the invention will be obvious to one of ordinary skill in the art for application to other protocols such as, for example, IPv6 address lookups, as well.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

We claim:

1. A method for processing data packets at a network node of a packet-based communications network, the method making use of one or more Ternary Content Addressable Memory, TCAM, devices which have been subdivided into a plurality of sub-tables, the method comprising the steps of:
   receiving a data packet having packet header information associated therewith;
   performing a first analysis of said packet header information to determine an identifier specifying one or more of said sub-tables of said one or more TCAM devices, wherein said one or more specified sub-tables comprise less than all of said plurality of sub-tables of said one or more TCAM devices; and
   performing a lookup in said one or more TCAM devices based on said identifier to retrieve categorization information associated with said packet header information, said lookup being limited to said one or more specified sub-tables of said one or more TCAM devices,
   wherein said step of performing a first analysis of said packet header information comprises performing a first-level lookup in a first-level TCAM device for use in said determination of said identifier, and
   wherein said categorization information has been derived based on a trie containing packet categorization information, wherein said trie has been partitioned into a first-level trie portion and a plurality of second-level trie portions, wherein said first-level TCAM device contains said first-level trie portion, wherein said one or more TCAM devices which have been subdivided into a plurality of sub-tables have been partitioned into a plurality of sub-table groups, each sub-table group comprising one or more of said sub-tables, and wherein each of said sub-table groups contains one of said second-level trie portions.

2. The method of claim 1, wherein said packet header information comprises a packet destination, and wherein said categorization information comprises packet routing information.

3. The method of claim 2, wherein said destination comprises a sequence of a plurality of bits, and wherein said step of performing a first analysis of said destination comprises performing a hash function based on a subset of said plurality of bits.

4. The method of claim 1, wherein said one or more TCAM devices which have been subdivided into a plurality of sub-tables do not include said first-level TCAM device used in said first-level lookup.

5. The method of claim 1, wherein said first-level TCAM device comprises one or more of said sub-tables of said one or more TCAM devices which have been subdivided into a plurality of sub-tables.

6. The method of claim 1, wherein said trie has been partitioned by performing a post-order traversal of said trie, and wherein each of said sub-table groups containing one of said second-level trie portions comprises:
   (i) one or more prefixes associated with one or more corresponding trie nodes encountered during said post-order traversal; and (ii) one or more covering prefixes of said one or more corresponding trie nodes, wherein said covering prefixes of said trie nodes comprise lowest common ancestors thereof.

7. The method of claim 6, wherein said trie has been partitioned such that each of said second-level portions consists of substantially one complete subtree of said trie, and wherein each of said sub-table groups containing one of said second-level trie portions comprises a number of said prefixes associated with said corresponding trie nodes included in said one complete subtree, said number being between a predetermined lower bound and a predetermined upper bound.

8. The method of claim 6, wherein said trie has been partitioned such that each of said sub-table groups containing one of said second-level trie portions consists of a substantially fixed, predetermined number of said prefixes.

9. A lookup engine for processing data packets at a network node of a packet-based communications network, the lookup engine comprising:
- an input port for receiving a data packet having packet header information associated therewith;
- a first circuit for determining an identifier based on said packet header information; and
- one or more Ternary Content Addressable Memory, TCAM, devices which have been subdivided into a plurality of sub-tables,
- wherein said identifier specifics one or more of said sub-tables of said one or more TCAM devices, wherein said one or more specified sub-tables comprise less than all of said plurality of sub-tables of said one or more TCAM devices, and wherein said one or more TCAM devices contain categorization information associated with said packet header information, said categorization information retrieved from said one or more TCAM devices by performing a lookup therein based on said identifier, said lookup being limited to said one or more specified sub-tables of said one or more TCAM devices,
- wherein said first circuit comprises a first-level TCAM device for use in a first-level lookup to determine said identifier, and
- wherein said categorization information has been derived based on a trie comprising packet categorization information, wherein said trie has been partitioned into a first-level trie portion and a plurality of second-level tie portions, wherein said first-level TCAM device contains said first-level trie portion, wherein said one or more TCAM devices which have been subdivided into a plurality of sub-tables have been partitioned into a plurality of sub-table groups, each sub-table group comprising one or more of said sub-tables, and wherein each of said sub-table groups contains one of said second-level trie portions.

10. The lookup engine of claim 9, wherein said packet header information comprises a packet destination and wherein said categorization information comprises packet routing information.

11. The lookup engine of claim 10, wherein said destination comprises a sequence of a plurality of bits, and wherein said first circuit comprises means for performing a hash function based on a subset of said plurality of bits.

12. The lookup engine of claim 9, wherein said one or more TCAM devices which have been subdivided into a plurality of sub-tables do not include said first-level TCAM device used in said first-level lookup.

13. The lookup engine of claim 9, wherein said first-level TCAM device comprises one or more of said sub-tables of said one or more TCAM devices which have been subdivided into a plurality of sub-tables.

14. The lookup engine of claim 9, wherein said trie has been partitioned by performing a post-order traversal of said trie, and wherein each of said sub-table groups containing one of said second-level trie portions comprises:
(i) one or more prefixes associated with one or more corresponding trie nodes encountered during said post-order traversal; and
(ii) one or more covering prefixes of said one or more corresponding trie nodes, wherein said covering prefixes of said trie nodes comprise lowest common ancestors thereof.

15. The lookup engine of claim 14, wherein said trie has been partitioned such that each of said second-level portions consists of substantially one complete subtree of said trie, and wherein each of said sub-table groups containing one of said second-level trie portions comprises a number of said prefixes associated with trie nodes included in said one complete subtree, said number being between a predetermined lower bound and a predetermined upper bound.

16. The lookup engine of claim 14, wherein said trie has been partitioned such that each of said sub-table groups containing one of said second-level trie portions consists of a substantially fixed, predetermined number of said prefixes.

* * * * *